(12) United States Patent
Ramsey et al.

(10) Patent No.: US 11,746,868 B2
(45) Date of Patent: Sep. 5, 2023

(54) TORQUE CONVERTER WITH RESOLVER ROTOR HAVING ANGULAR AND AXIAL LOCKING

(71) Applicant: Schaeffler Technologies AG & Co. KG, Herzogenaurach (DE)

(72) Inventors: John Ramsey, Mansfield, OH (US); Angel Salvador Flores, Puebla (MX); Daniel Linton, North Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/532,956

(22) Filed: Nov. 22, 2021

(65) Prior Publication Data
US 2023/0160459 A1 May 25, 2023

(51) Int. Cl.
*F16H 41/24* (2006.01)
*F16H 41/04* (2006.01)
F16H 57/00 (2012.01)

(52) U.S. Cl.
CPC ............ *F16H 41/24* (2013.01); *F16H 41/04* (2013.01); *F16H 57/0025* (2013.01); *F16H 2041/243* (2013.01)

(58) Field of Classification Search
CPC ..... F16H 41/04; F16H 41/24; F16H 2041/243
See application file for complete search history.

(56) References Cited

U.S. PATENT DOCUMENTS

| 5,211,262 | A | * | 5/1993 | Akiyama | ............ | F16H 57/0434 |
| | | | | | | 184/6.12 |
| 7,017,340 | B2 | * | 3/2006 | Chicky | .................. | F16H 41/24 |
| | | | | | | 60/330 |
| 10,895,285 | B2 | * | 1/2021 | Soroka | ................ | F16H 57/0025 |
| 2021/0273542 | A1 | | 9/2021 | Payne et al. | | |

* cited by examiner

*Primary Examiner* — Tinh Dang
(74) *Attorney, Agent, or Firm* — Volpe Koenig (57) ABSTRACT

A torque converter, including: a cover arranged to receive torque; a pump including a pump shell connected to the cover, and pump blades; a turbine in fluid communication with the pump and including a turbine shell and turbine blades; a stator including stator blades disposed between the turbine and the pump; a pump hub non-rotatably connected to the pump shell and including a first planar surface facing radially outward with respect to an axis of rotation; and a resolver rotor non-rotatably connected to the pump hub and including a second planar surface in contact with the first planar surface and facing radially inward with respect to the axis of rotation. The pump hub includes a protrusion extending radially outward from the first planar surface and in contact with the resolver rotor. The resolver rotor is arranged to determine a rotational position of the torque converter around the axis of rotation.

18 Claims, 8 Drawing Sheets

Fig. 8

TORQUE CONVERTER WITH RESOLVER ROTOR HAVING ANGULAR AND AXIAL LOCKING

TECHNICAL FIELD

The present disclosure relates to a torque converter using planar surfaces to non-rotatably connect a resolver rotor to a pump hub.

BACKGROUND

It is known to use a shrink fit to connect a resolver rotor to a pump hub of a torque converter. The heat associated with a shrink fit may be incompatible with preferred materials for the rotor or pump hub.

SUMMARY

According to aspects illustrated herein, there is provided a torque converter, including: a cover arranged to receive torque and supported for rotation around an axis of rotation; a pump including a pump shell connected to the cover, and at least one pump blade; a turbine in fluid communication with the pump and including a turbine shell, and at least one turbine blade; a stator including at least one stator blade axially disposed between the turbine and the pump; a pump hub non-rotatably connected to the pump shell and including a first planar surface; and an annular resolver rotor including a second planar surface in contact with the first planar surface. The annular resolver rotor is arranged to determine a rotational position of the torque converter around the axis of rotation.

According to aspects illustrated herein, there is provided a torque converter, including: a cover arranged to receive torque and supported for rotation around an axis of rotation; a pump including pump shell connected to the cover, and at least one pump blade; a turbine in fluid communication with the pump and including a turbine shell, and at least one turbine blade; a stator including at least one stator blade axially disposed between the turbine and the pump; a pump hub non-rotatably connected to the pump shell and including a first planar surface facing radially outward with respect to the axis of rotation; and an annular resolver rotor including a second planar surface in contact with the first planar surface and facing radially inward with respect to the axis of rotation. The annular resolver rotor is arranged to determine a rotational position of the torque converter around the axis of rotation.

According to aspects illustrated herein, there is provided a torque converter, including: a cover arranged to receive torque and supported for rotation around an axis of rotation; a pump including a pump shell connected to the cover, and at least one pump blade; a turbine in fluid communication with the pump and including a turbine shell, and at least one turbine blade; a stator including at least one stator blade axially disposed between the turbine and the pump; a pump hub non-rotatably connected to the pump shell and including a first planar surface facing radially outward with respect to the axis of rotation; and an annular resolver rotor non-rotatably connected to the pump hub and including a second planar surface in contact with the first planar surface and facing radially inward with respect to the axis of rotation. The pump hub includes a protrusion extending radially outward from the first planar surface and in contact with the annular resolver rotor. The annular resolver rotor is arranged to determine a rotational position of the torque converter around the axis of rotation.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
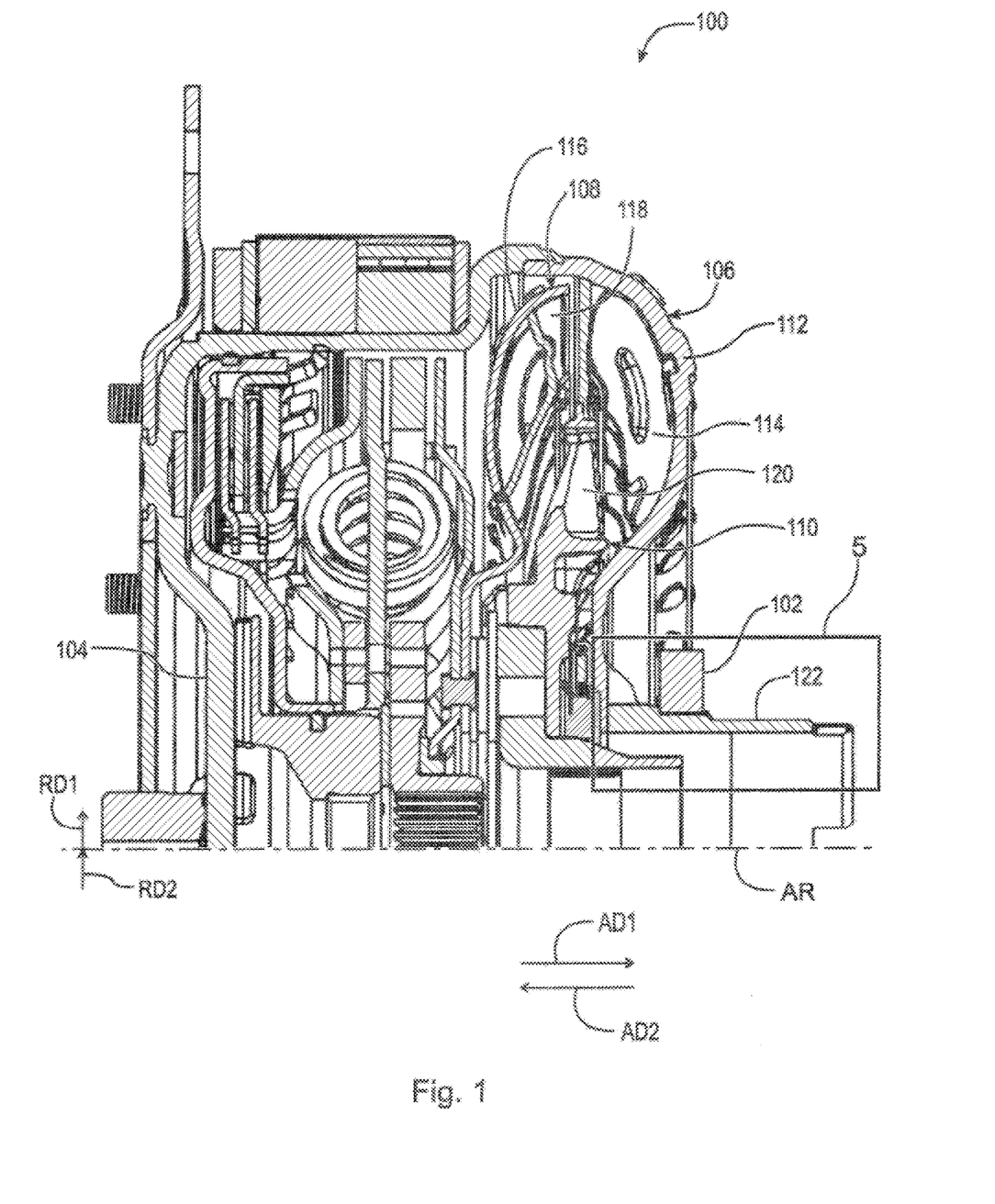
FIG. 1 is a partial cross-sectional view of an example torque converter including an annular resolver rotor having angular and axial locking.

FIG. 1 is a partial cross-sectional view of example torque converter 100 including an annular resolver rotor having angular and axial locking.

Figure 2:
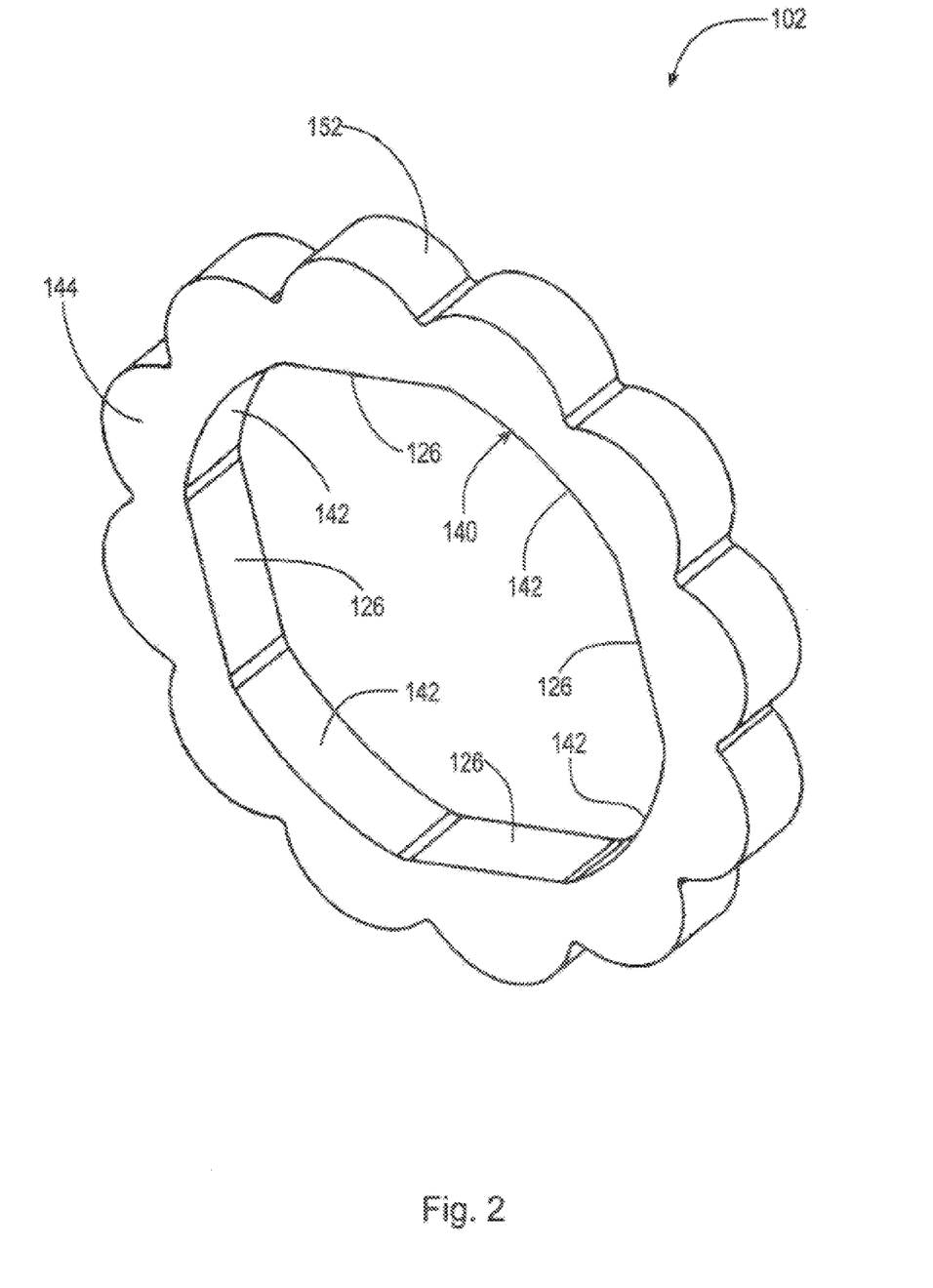
FIG. 2 is an isometric view of the resolver rotor shown in FIG. 1.

FIG. 2 is an isometric view of the annular resolver rotor shown in FIG. 1. The following should be viewed in light of FIGS. 1 and 2. Torque converter 100 is supported for rotation around axis of rotation AR and includes: annular resolver rotor 102; cover 104; pump 106; turbine 108; and stator 110. Pump 106 includes pump shell 112 non-rotatably connected to cover 104, and at least one pump blade 114. Turbine 108 is in fluid communication with pump 106 and includes turbine shell 116, and at least one turbine blade 118. Stator 110 includes at least one stator blade 120 axially disposed between turbine 108 and pump 106.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 3:
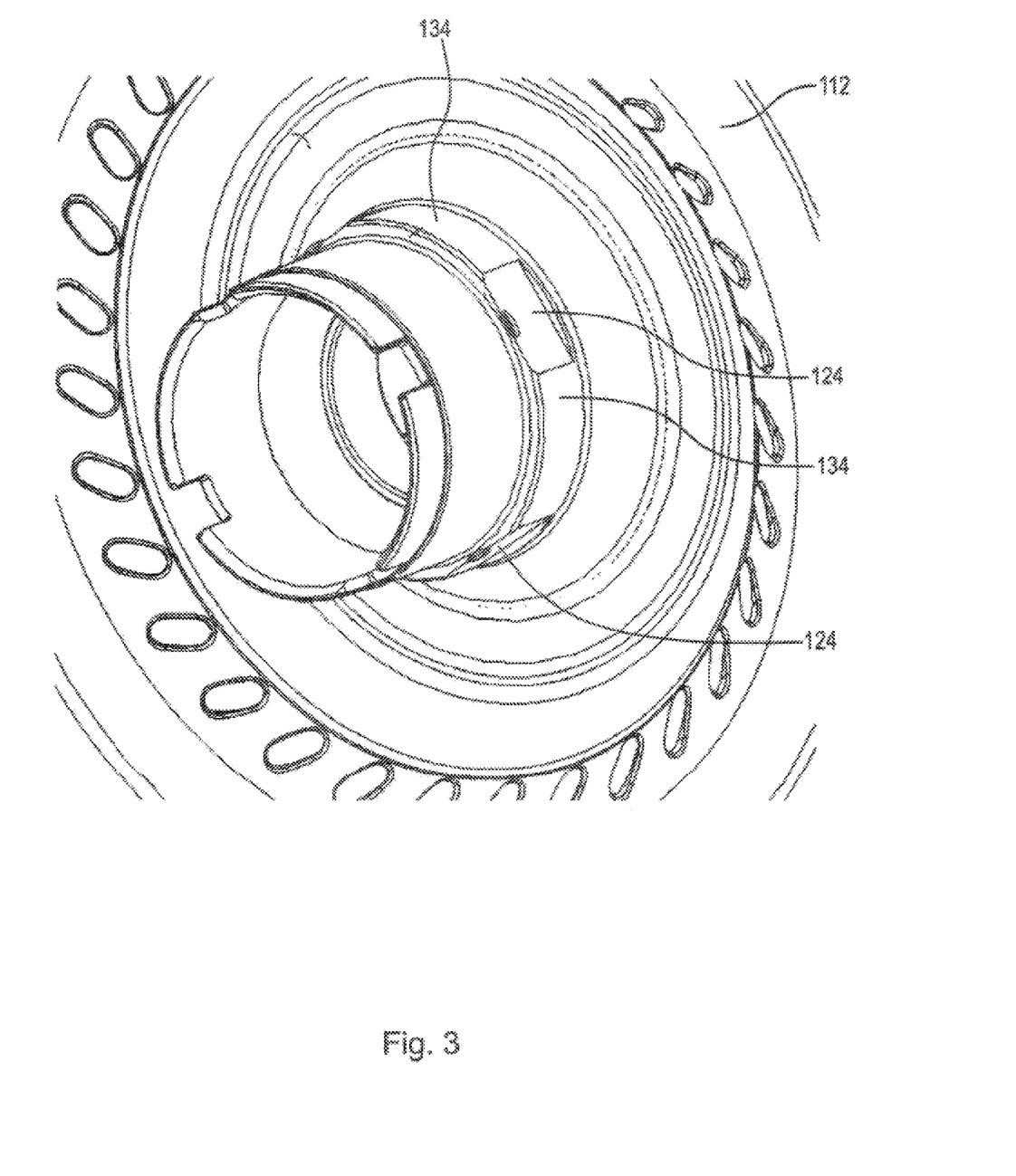
FIG. 3 is an isometric front detail of the pump hub of the torque converter shown in FIG. 1, with the resolver rotor removed.

FIG. 3 is an isometric front detail of the pump hub of torque converter 100 shown in FIG. 1, with the resolver rotor removed.

Figure 4:
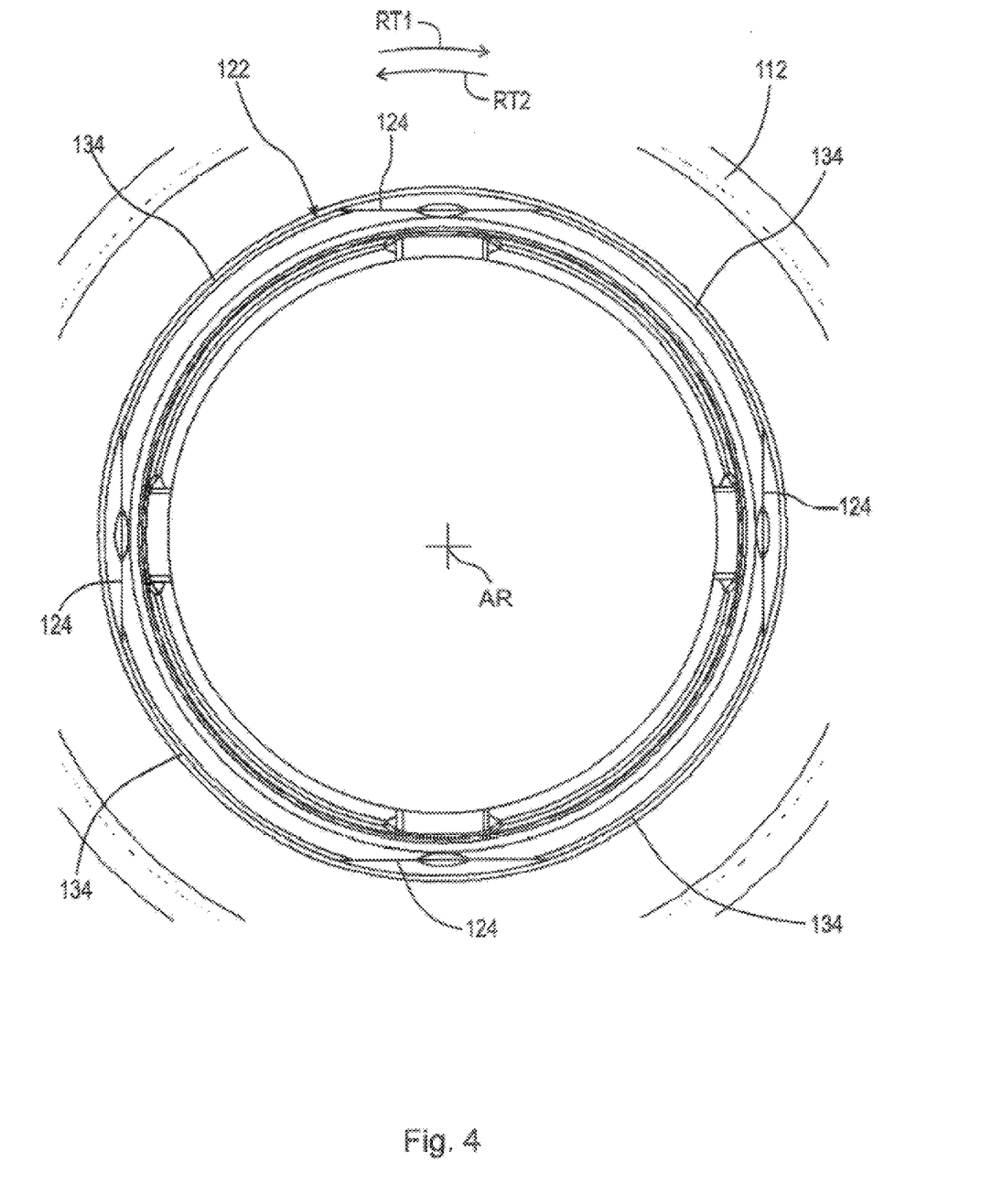
FIG. 4 is a front detail of the pump hub of the torque converter shown in FIG. 1, with the resolver rotor removed.

FIG. 4 is a front detail of the pump hub of torque converter 100 shown in FIG. 1, with the resolver rotor removed. The following should be viewed in light of FIGS. 1 through 4. Torque converter 100 includes pump hub 122 non-rotatably connected to pump shell 112 and including planar surfaces 124. Resolver rotor 102 is radially disposed around hub 122 and includes planar surfaces 126 in contact with planar surfaces 124. A further described below, resolver rotor 102 is arranged to determine a rotational position of torque converter 100 around axis of rotation AR. Surfaces 124 face in radially outer direction RD1, orthogonal to axis of rotation AR. Surfaces 126 face in radially inner direction RD2, opposite direction RD1. Pump hub 122 extends past pump shell 112 in axial direction AD1. Direction AD1 is from cover 104 toward shell 112.

In the example of FIG. 1, pump hub 122 includes four surfaces 124 and resolver rotor 102 includes four surfaces 126. It is understood that other numbers of surfaces 124 and surfaces 126 are possible.

Figure 5:
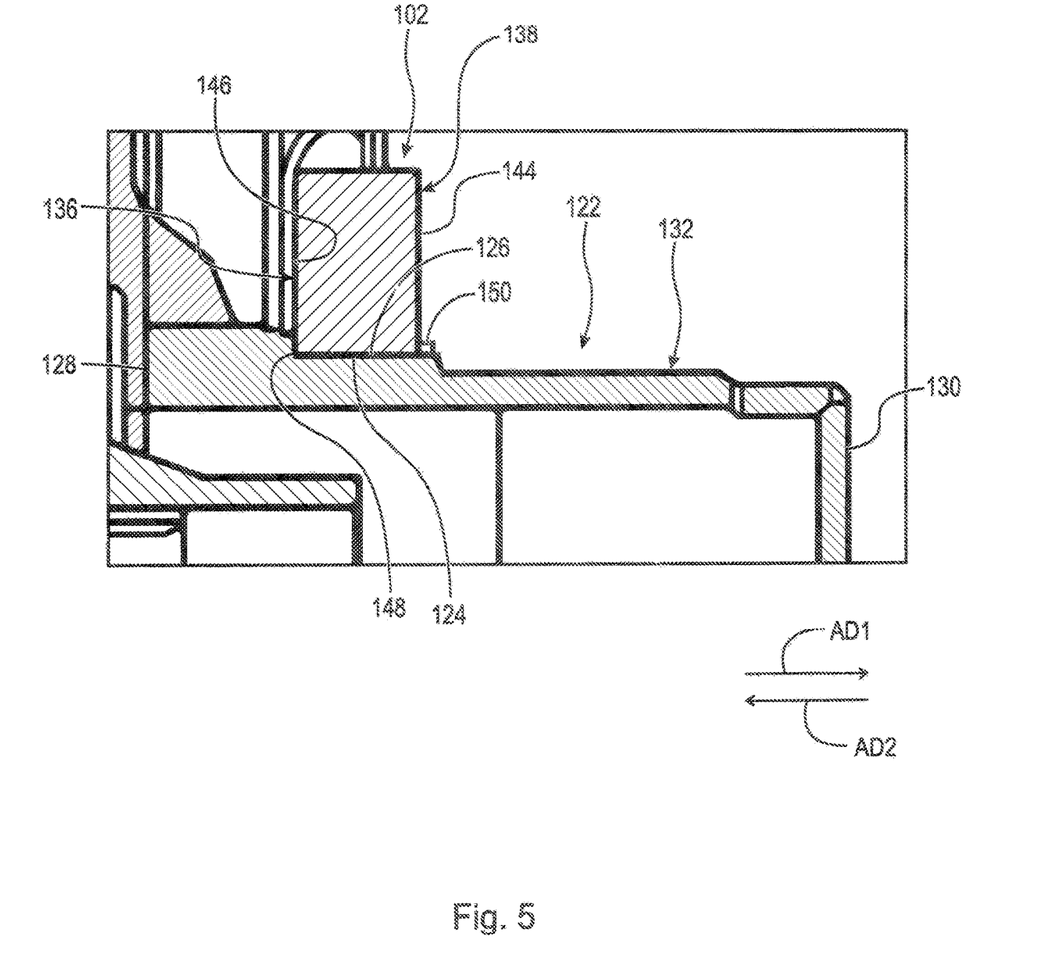
FIG. 5 is a detail of area 5 in FIG. 1.

FIG. 5 is a detail of area 5 in FIG. 1.

Figure 6:
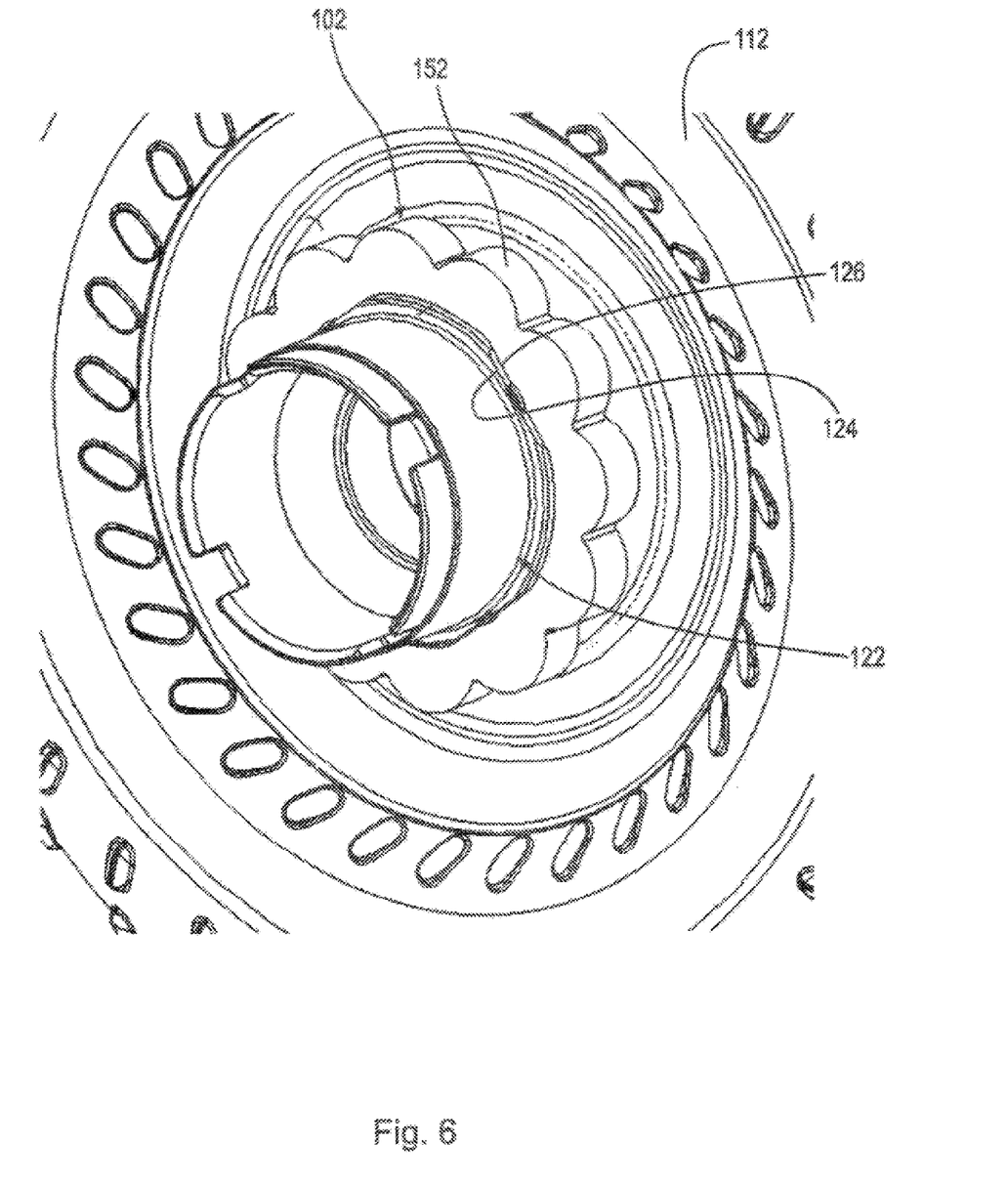
FIG. 6 is an isometric front detail of the pump hub and annular resolver rotor of the torque converter shown in FIG. 1.

FIG. 6 is an isometric front detail of pump hub 122 and annular resolver rotor 102 of torque converter 100 shown in FIG. 1.

Figure 7:
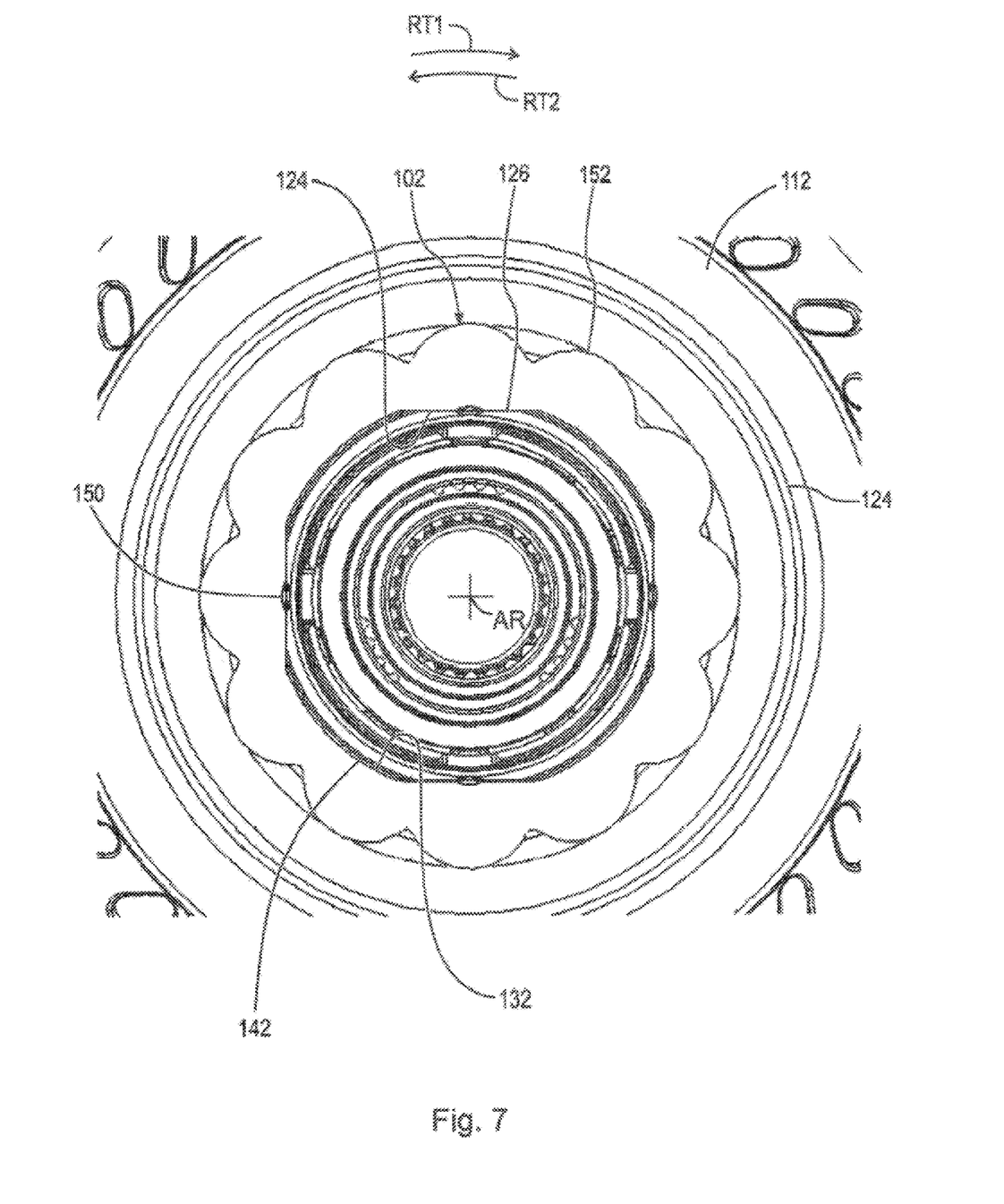
FIG. 7 is a front detail of the pump hub and annular resolver rotor of the torque converter shown in FIG. 1; and, FIG. 8 is a schematic block diagram of a control arrangement for the torque converter shown in FIG. 1.

FIG. 7 is a front detail of pump hub 122 and annular resolver rotor 102 of torque converter 100 shown in FIG. 1. The following should be viewed in light of FIGS. 1 through 7. Pump hub 122 includes axial end 128, axial end 130, and radially outer surface 132 connecting ends 128 and 130. Surface 132 includes surfaces 124. Surface 132 includes curved segments 134 connecting surfaces 124 in opposite rotational directions RT1 and RT2 around axis AR. Resolver rotor 102 includes axial end 136, axial end 138, and radially inner surface 140 connecting ends 136 and 138. Surface 140 includes surfaces 126. Surface 140 includes curved segments 142 connecting surfaces 126 in rotational directions RT1 and RT2. In the example of FIG. 1, surfaces 134 and 142 are in contact. In the example embodiment (not shown), surfaces 134 and 142 are free of contact.

Resolver rotor 102 includes: surface 144 facing in direction AD1; and surface 146, facing in direction AD2, opposite direction AD1. In the example of FIG. 1, surfaces 144 and 146 are planar. Pump hub 122 includes surface 148 in contact with surface 146. In the example of FIG. 1, surface 148 is planar. Pump hub 122 includes protrusions 150 extending radially outwardly past surfaces 124 and in contact with surfaces 144. Surfaces 148 and protrusions 150 axially fix resolver rotor 102 with respect to pump hub 122.

In the example of FIG. 1, protrusions 150 are formed by displacing material forming hub 122, for example, by staking hub 122.

In the example of FIG. 1, there is single protrusion 150 for each surface 124, and the single protrusion 150 is centered, in directions RT1 and RT2, with respect to the surfaces 124. It is understood that other numbers and configurations of protrusions 150 are possible.

Figure 8:
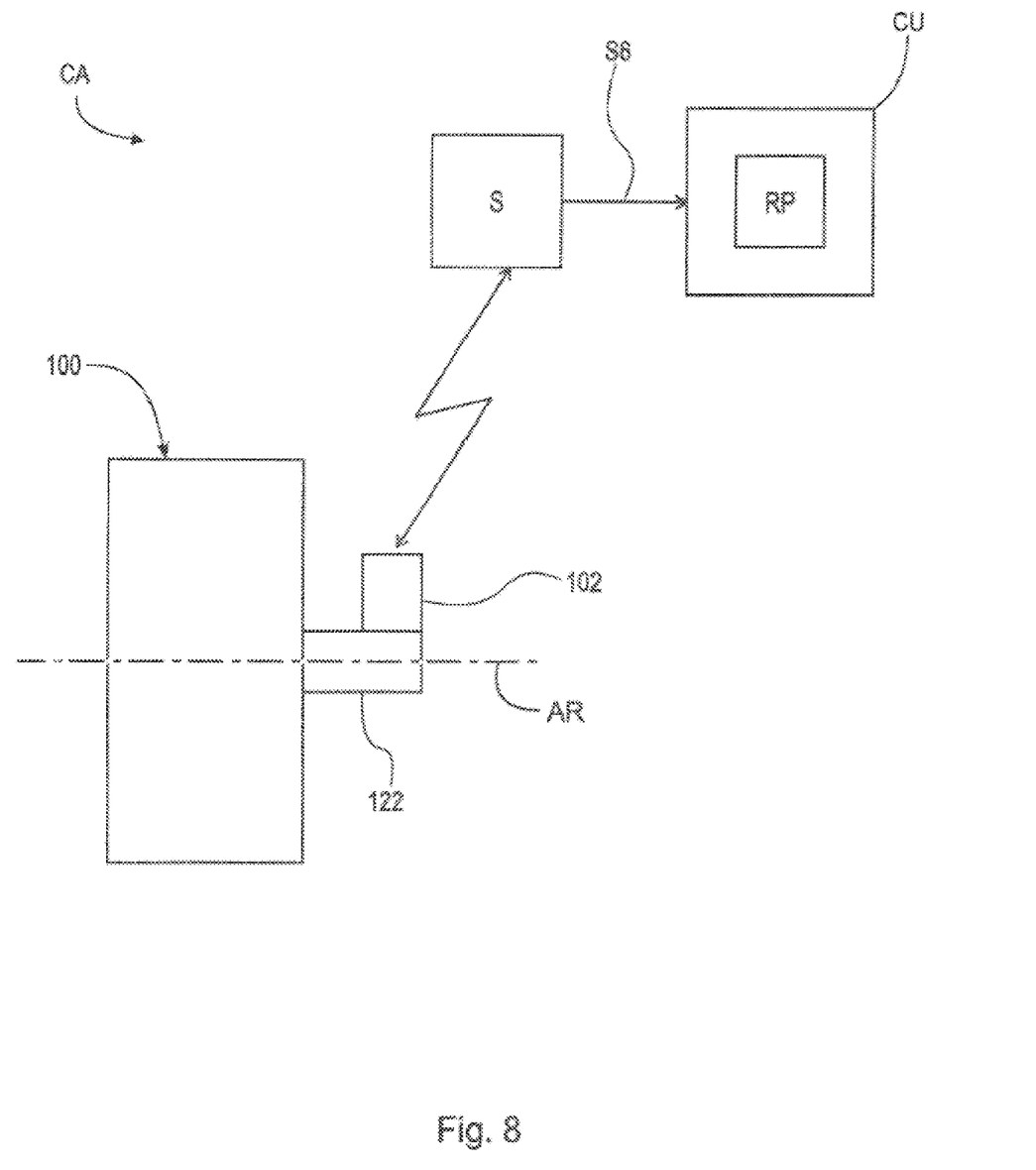

FIG. 8 is a schematic block diagram of control arrangement CA for torque converter 100 shown in FIG. 1. Control arrangement CA includes sensor S and control unit CU. As is known in the art, resolver rotor 102 is used to measure rotational position RP of torque converter 100 with respect to axis of rotation AR. In the example of FIG. 8, sensor S senses the rotational position of features of resolver rotor 102, for example, portions of radially outer surface 152 of rotor 102. Sensor S sends signal SG to control unit CU. Control unit CU uses signal SG to measure rotational position RP of torque converter 100.

The following should be viewed in light of FIGS. 1 through 8. The following describes a method for operating a torque converter including: a cover arranged to receive torque and supported for rotation around an axis of rotation; a pump including a pump shell connected to the cove, and at least one pump blade; a turbine in fluid communication with the pump and including a turbine shell, and at least one turbine blade; a stator including at least one stator blade axially disposed between the turbine and the pump; a pump hub non-rotatably connected to the pump shell; and an annular resolver rotor non-rotatably connected to the pump hub. The pump hub includes a protrusion extending radially outward from the first planar surface and in contact with the annular resolver rotor.

Although the method is presented as a sequence of steps for clarity, no order should be inferred from the sequence unless explicitly stated. A first step measures, using the annular resolver rotor, a sensor, and a control device, a first rotational position of the cover around the axis of rotation. A second step rotates the cover and the pump hub in a first rotational direction around the axis of rotation. A third step rotates the resolver rotor via contact between a planar surface of the pump hub facing radially outward with respect to the axis of rotation, and a planar surface of the resolver facing radially inward with respect to the axis of rotation. A fourth step measures, using the annular resolver rotor, the sensor, and the control device, a second rotational position of the cover around the axis of rotation.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CA control arrangement
CU control unit
RD1 radially outer direction
RD2 radially inner direction
RP rotational position
RT1 rotational direction RT2 rotational direction
S sensor
SG signal
100 torque converter
102 resolver rotor
104 cover
106 pump
108 turbine
110 stator
112 pump shell
114 pump blade
116 turbine shell
118 turbine blade
120 stator blade
122 pump hub
124 planar surface, pump hub
126 planar surface, resolver rotor
128 axial end, pump hub
130 axial end, pump hub
132 radially outer surface, pump hub
134 curved segment, surface 132
136 axial end, resolver rotor
138 axial end, resolver rotor
140 radially inner surface, resolver rotor
142 curved segment, surface 140
144 surface, resolver rotor
146 surface, resolver rotor
148 surface, pump hub
150 protrusion, pump hub
152 radially outer surface, resolver rotor

The invention claimed is:

1. A torque converter, comprising:
a cover arranged to receive torque and supported for rotation around an axis of rotation;
a pump including:
a pump shell connected to the cover; and,
at least one pump blade;
a turbine in fluid communication with the pump and including:
a turbine shell; and,
at least one turbine blade;
a stator including at least one stator blade axially disposed between the turbine and the pump;
a pump hub non-rotatably connected to the pump shell and including a first planar surface and a first surface perpendicular to the axis of rotation such that the first surface faces in a first axial direction parallel to the axis of rotation; and,
an annular resolver rotor including a second planar surface in contact with the first planar surface, and a second surface facing in a second axial direction opposite the first axial direction, the second surface in contact with the first surface, wherein the annular resolver rotor is arranged to determine a rotational position of the torque converter around the axis of rotation.

2. The torque converter of claim 1, wherein the first planar surface faces in a radially outer direction orthogonal to the axis of rotation.

3. The torque converter of claim 1, wherein the second planar surface faces in a radially inner direction orthogonal to the axis of rotation.

4. The torque converter of claim 1, wherein:
the pump hub includes a first axial end, a second axial end, and a radially outer surface connecting the first axial end and the second axial end; and,
the radially outer surface includes the first planar surface.

5. The torque converter of claim 4, wherein:
the pump hub includes a third planar surface; and,
the radially outer surface includes a curved segment connecting the first planar surface and the third planar surface.

6. The torque converter of claim 1, wherein:
the annular resolver rotor includes a first axial end, a second axial end, and a radially inner surface connecting the first axial end and the second axial end; and,
the radially inner surface includes the second planar surface.

7. The torque converter of claim 6, wherein:
the annular resolver rotor includes a third planar surface; and,
the radially inner surface includes a curved segment connecting the first planar surface and the third planar surface.

8. The torque converter of claim 1, wherein the annular resolver rotor is radially disposed around the pump hub.

9. The torque converter of claim 1, further comprising:
a lock-up clutch, wherein:
the pump hub extends past the pump shell in an axial direction parallel to the axis of rotation; and,
the axial direction is from the cover toward the pump shell.

10. The torque converter of claim 1, wherein:
the annular resolver rotor includes a third surface facing in the first axial direction;
the pump hub includes a protrusion extending radially outwardly past the first planar surface and in contact with the third surface; and,
the first surface and the protrusion axially fix the annular resolver rotor with respect to the pump hub.

11. The torque converter of claim 1, wherein:
the annular resolver rotor includes a third surface facing in an axial direction parallel to the axis of rotation; and,
the pump hub includes a protrusion extending radially outwardly past the first planar surface and in contact with the third surface.

12. A torque converter, comprising:
a cover arranged to receive torque and supported for rotation around an axis of rotation;
a pump including:
a pump shell connected to the cover; and,
at least one pump blade;
a turbine in fluid communication with the pump and including:
a turbine shell; and,
at least one turbine blade;
a stator including at least one stator blade axially disposed between the turbine and the pump;
a pump hub non-rotatably connected to the pump shell and including a first planar surface facing radially outward with respect to the axis of rotation, wherein the first planar surface is a portion of a radially outermost surface of the pump hub; and,
an annular resolver rotor including first and second pairs of radially inwardly facing planar surfaces with one of the first or second pairs of inwardly facing planar surfaces including a second planar surface in contact with the first planar surface and facing radially inward with respect to the axis of rotation, wherein the annular resolver rotor is arranged to determine a rotational position of the torque converter around the axis of rotation.

13. The torque converter of claim 12, wherein:
the annular resolver rotor includes an inner radially outermost surface; and,
the second planar surface is a portion of the inner radially outermost surface.

14. The torque converter of claim 12, further comprising:
a lock-up clutch, wherein:
the pump hub extends past the pump shell in an axial direction parallel to the axis of rotation; and,
the axial direction is from the cover toward the pump shell.

15. The torque converter of claim 12, wherein:
the pump hub includes a third planar surface facing in a first axial direction parallel to the axis of rotation; and,
the annular resolver rotor includes a fourth planar surface facing in a second axial direction, opposite the first axial direction, and in contact with the third planar surface.

16. The torque converter of claim 15, wherein:
the annular resolver rotor includes a fifth planar surface facing in the first axial direction;
the pump hub includes a protrusion extending radially outwardly past the first planar surface and in contact with the fifth planar surface; and,
the fifth planar surface and the protrusion fix an axial position of the annular resolver rotor.

17. The torque converter of claim 12, wherein:
the annular resolver rotor includes a third planar surface facing in an axial direction parallel to the axis of rotation; and,
the pump hub includes a protrusion extending radially outwardly past the first planar surface and in contact with the third planar surface.

18. A torque converter, comprising:
a cover arranged to receive torque and supported for rotation around an axis of rotation;
a pump including:
a pump shell connected to the cover; and,
at least one pump blade;
a turbine in fluid communication with the pump and including:
a turbine shell; and,
at least one turbine blade;
a stator including at least one stator blade axially disposed between the turbine and the pump;
a pump hub non-rotatably connected to the pump shell and including a first planar surface facing radially outward with respect to the axis of rotation; and,
an annular resolver rotor non-rotatably connected to the pump hub and including a second planar surface in contact with the first planar surface and facing radially inward with respect to the axis of rotation, wherein:
the pump hub includes a protrusion extending radially outward from the first planar surface and in contact with the annular resolver rotor; and,
the annular resolver rotor is arranged to determine a rotational position of the torque converter around the axis of rotation.

* * * * *